(12) United States Patent
Marshall et al.

(10) Patent No.: US 10,558,440 B2
(45) Date of Patent: Feb. 11, 2020

(54) TIGHTLY INTEGRATED ACCELERATOR FUNCTIONS

(71) Applicant: CISCO TECHNOLOGY, INC., San Jose, CA (US)

(72) Inventors: John W. Marshall, Cary, NC (US); Earl Hardin Booth, III, Raleigh, NC (US); Andrew William Keep, Durham, NC (US); Robert Leroy King, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/607,138

(22) Filed: May 26, 2017

(65) Prior Publication Data

US 2018/0217823 A1 Aug. 2, 2018

Related U.S. Application Data

(60) Provisional application No. 62/453,898, filed on Feb. 2, 2017.

(51) Int. Cl.
*G06F 9/44* (2018.01)
*G06F 8/35* (2018.01)
*G06F 9/445* (2018.01)
*G06F 9/54* (2006.01)
*G06F 8/41* (2018.01)

(52) U.S. Cl.
CPC ............ *G06F 8/4441* (2013.01); *G06F 8/447* (2013.01)

(58) Field of Classification Search
CPC .. G06Q 20/322; G06Q 20/36; G06Q 20/3674; G06Q 20/40; H04L 41/0893; H04L 69/22; G06F 9/44; G06F 8/41; G06F 8/51; G06F 8/71; G06F 9/451; G06F 9/541; G06F 17/5045; G06F 8/447; G06F 8/4441; G06F 8/31; G06F 8/443; G06F 8/35;

(Continued)

(56) References Cited

U.S. PATENT DOCUMENTS 9,891,898 B1 * 2/2018 Tonsing .................... G06F 8/41
10,067,755 B2 * 9/2018 Kaminski ................. G06F 8/65

(Continued)

OTHER PUBLICATIONS

Shahbaz et al., PISCES: A Programmable, Protocol-Independent Software Switch, 14 pages (Year: 2016).*

(Continued)

*Primary Examiner* — Thuy Dao

(57) ABSTRACT

In an example, there is disclosed a computing system, including: a processor; a memory; a configuration interface to a logic configuration unit; and a system compiler including: a first block compiler to compile logic for a first logical block in a first language, the first language being a domain-specific language (DSL) and the first logical block being switching logic for a network switch; a second block compiler to compile logic for a second logical block in a second language, the second language being a non-DSL and providing an external accelerator method not supported by the first language; and an interface compiler to define input/output channels for encapsulated data interchange between the first logical block and the second logical block, wherein the encapsulated data interchange is to target a resident instance of the external accelerator method.

20 Claims, 8 Drawing Sheets

(58) Field of Classification Search
CPC ........ G06F 8/427; G06F 8/65; G06F 9/45516; G07F 17/32; G07F 17/323
See application file for complete search history.

(56) References Cited

U.S. PATENT DOCUMENTS

| | | | | |
|---|---|---|---|---|
| 10,078,501 | B2* | 9/2018 | Narayanan | G06F 8/35 |
| 10,379,824 | B2* | 8/2019 | Smiljanic | G06F 16/22 |
| 2006/0225054 | A1* | 10/2006 | Sentovich | G06F 8/41 |
| | | | | 717/140 |
| 2012/0124564 | A1* | 5/2012 | Ringseth | G06F 8/45 |
| | | | | 717/146 |
| 2012/0254541 | A1* | 10/2012 | Beckmann | G06F 12/0802 |
| | | | | 711/122 |
| 2016/0080425 | A1* | 3/2016 | Cianfrocca | H04L 63/0227 |
| | | | | 726/1 |
| 2016/0110353 | A1* | 4/2016 | Merrill | G06F 17/3012 |
| | | | | 707/748 |
| 2016/0210075 | A1* | 7/2016 | Frank | G06F 3/061 |
| 2017/0168792 | A1* | 6/2017 | Bhattacharya | G06F 8/51 |

OTHER PUBLICATIONS

Patra et al., MACSAD: Multi-Architecture Compiler System for Abstract Dataplanes (aka Partnering P4 with ODP), 2 pages (Year: 2016).*

Wikipedia Contributors, "OpenCL," Wikipedia, The Free Encyclopedia, May 17, 2017, 10 pages; https://en.wikipedia.org/w/index.php?title=OpenCL&oldid=780844016.

Wikipedia contributors, "P4 (programming language)," Wikipedia, The Free Encyclopedia, Mar. 5, 2017, 4 pages; https://en.wikipedia.org/w/index.php?title=P4_(programming_language)&oldid=768805115.

"The P4 Language Specification," The P4 Language Consortium, Version 1.0.3, Nov. 2, 2016, 97 pages.

* cited by examiner

TIGHTLY INTEGRATED ACCELERATOR FUNCTIONS

CROSS REFERENCE TO RELATED APPLICATIONS

This Application claims priority to U.S. Provisional Application 62/453,898, titled "IMPLICIT KERNEL LAUNCH," filed Feb. 2, 2017, which is incorporated herein by reference.

FIELD OF THE SPECIFICATION

This disclosure relates in general to the field of computer networking, and more particularly, though not exclusively to, a system and method for tightly integrated accelerator functions.

BACKGROUND

In modern computing practice, data centers have become more important than individual machines. A user's desktop may be hosted on the network and accessed via a minimalized client device. On the server side, individual servers and appliances have been replaced by large racks of identical servers that are provisioned with virtual machines (VMs) providing the individual functions, controlled by a hypervisor.

In some cases, a virtualized network may also include network function virtualization (NFV), which provides certain network functions as virtual appliances. These functions may be referred to as virtual network functions (VNFs). Other data centers may be based on software-defined networking (SDN), or other similar data center technologies.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
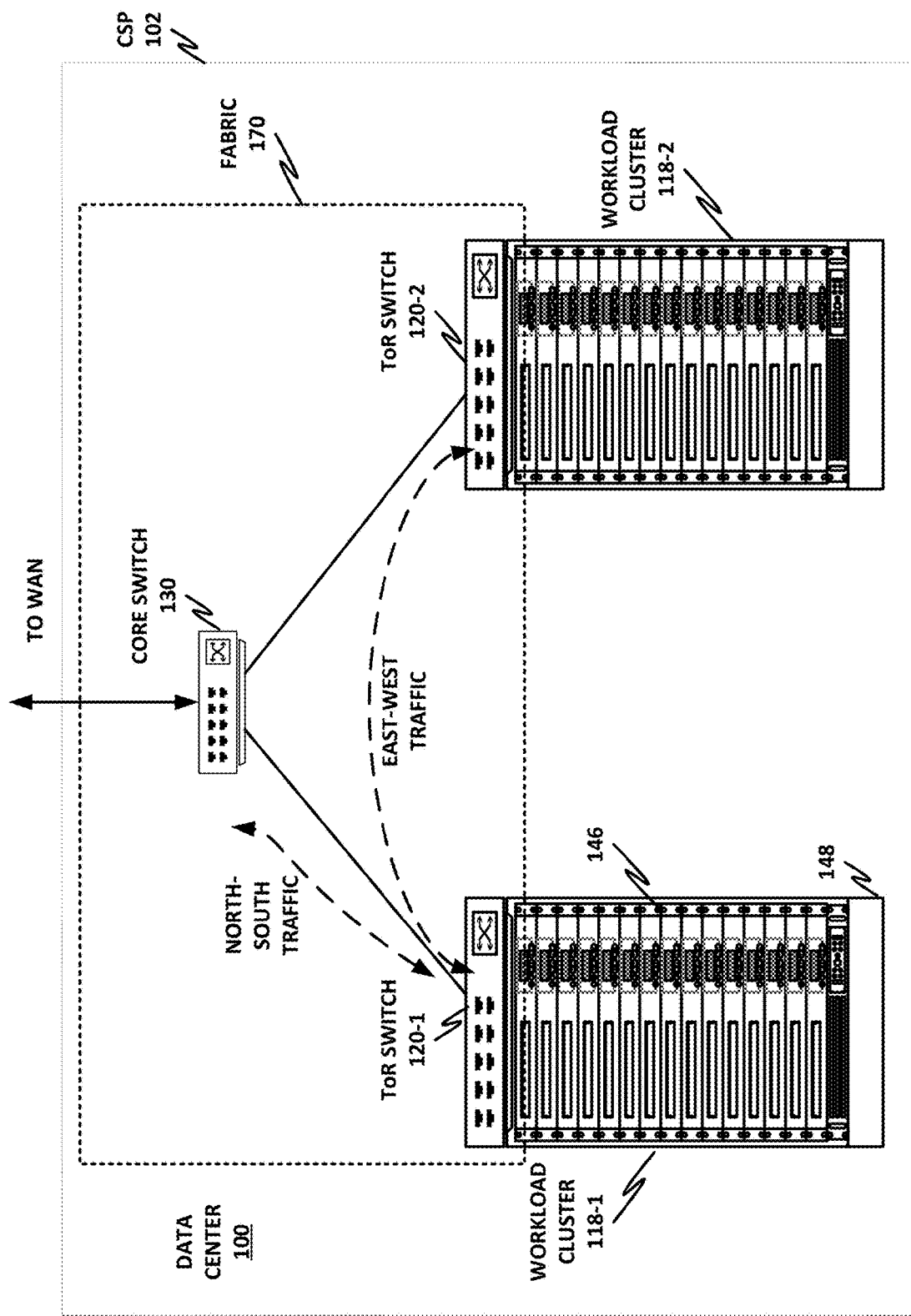
FIG. 1 is a network-level diagram of a cloud service provider (CSP), according to one or more examples of the present specification.

In an example, there is disclosed a computing system, including: a processor; a memory; a configuration interface to a logic configuration unit; and a system compiler including: a first block compiler to compile logic for a first logical block in a first language, the first language being a domain-specific language (DSL) and the first logical block being switching logic for a network switch; a second block compiler to compile logic for a second logical block in a second language, the second language being a non-DSL and providing an external accelerator method not supported by the first language; and an interface compiler to define input/output channels for encapsulated data interchange between the first logical block and the second logical block, wherein the encapsulated data interchange is to target a resident instance of the external accelerator method.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A switch is a network element that, at its most basic, receives network packets on one or more ingress ports, and switches those packets to one or more egress ports. This process is known generally as "packet forwarding," and is a key function in modern networking.

In a very small and simple network, switching can be an almost trivial task. The switch may include very simple programming for directing traffic from ingress ports to egress ports. However, in larger networks, switching can become a very difficult problem. For example, in a large data center, thousands of nodes may be interconnected by a switching fabric with multiple layers of switching. For example, switches may be provided in a leaf-spine architecture, in which a hierarchy of switches is provided.

Not only must the switches in a large data center provide ordinary packet switching, but in contemporary data centers, switches are increasingly relied on for more complex functions. For example, the data center may require services such as compression, decompression, IP security, encryption, decryption, load-balancing, routing, and other related services to be performed. To increase the speed at which these services are performed, some or all of these may be performed on the switch itself. Thus, rather than being a simple single function device, the switch may become a very capable piece of the network that performs these functions, while freeing up other compute resources in the data center to perform other tasks.

One relatively recent improvement in the design of network switching is the use of domain specific languages (DSL) such as the packet forwarding language P4. A domain specific language is a computer language that may be specially targeted to a specific problem domain. Thus, the DSL may provide relatively rich and powerful primitives within its intended domain, but may have little or limited functionality outside of that domain. In other words, DSL is commonly not a Turing complete language, but rather a language that provides only those capabilities that are relevant to the problem domain of the language. P4 is an example of a DSL whose domain is packet forwarding. P4 is a powerful packet forwarding language that includes primitives and operations that are optimized specifically for packet switching and other network data forwarding algorithms.

DSLs provide multiple advantages. For example, because a DSL is application-specific, design automation tools may be able to compile highly optimized implementations that may be more difficult to achieve using a general-purpose optimizer or logic synthesis tool. DSLs are advantageously able to achieve such optimization while exposing a relatively simplified programming model to the programmer, thus allowing applications to be quickly prototyped, developed, tested, and implemented.

One advantage of DSLs such as P4 is that the language itself may be portable. Thus, a DSL compiler may have the ability to compile a program or function written in the language for a variety of target devices. By way of example, a programmer may author a network forwarding logic in P4, and may then use the same identical source code or nearly identical source code to compile the algorithm for a variety of different devices such as a central processing unit (CPU), digital signal processor (DSP), FPGA, GPU, ASIC, or network processor by way of nonlimiting example. The target hardware device programmed in P4 may then be used to provide the packet switching logic of a network switch.

Because P4 is a DSL, and because it is not Turing complete, P4 may not expose the ability to provide other types of logic and network services that can be performed on a switch. Furthermore, it may be desirable to keep such auxiliary or supplementary functions away from the core switching logic. Thus, in certain embodiments, an accelerator which may be a hardware or software accelerator may be provided in additional hardware to that of the core packet switching logic. This accelerator may perform an offloaded network function such as compression, decompression, IP security, encryption, decryption, load-balancing, routing, and other routine functions.

In some embodiments, the accelerator may be provided on-die with the same ASIC as the core switching logic. In other words, a single-die integrated circuit may include the core switching logic, as well as accelerator logic interconnected by an on-die bus. In other examples, accelerators may be performed in separate hardware, such as a CPU, GPU, FPGA, ASIC, network processor, or other programmable logic.

In an embodiment of the present specification, an accelerator is provided—either on-die or on separate hardware—and may be programmed with a Turing complete language such as OpenCL. OpenCL is a framework for writing software that can be executed across heterogeneous hardware devices such as those mentioned herein. OpenCL provides a Turing complete programming language based on C99, as well as application programming interfaces (APIs) that enable the various heterogeneous resources to communicate with one another.

The OpenCL specification is an example of a multiplatform parallel programming language that in some cases may complement a DSL, such as a P4 program providing high-performance packet switching.

In an embodiment, a core ASIC is programmed in P4 to provide the core packet switching algorithm. One or more accelerator functions are provided and are programmed in OpenCL. An interface may then be defined between the core packet switching logic and the accelerator that enables the core packet switching logic, which is not Turing complete, to offload certain functions to the accelerator. The interface may provide, for example, numbers and types of data inputs and outputs, data types, and signaling protocols by way of nonlimiting example.

In OpenCL, a piece of code that runs on a target device is referred to as a "kernel." Such kernels may provide relatively complex algorithms that can be offloaded to accelerators. One challenge with OpenCL kernels, however, is that in many embodiments launching a kernel explicitly requires relatively high overhead. For example, the core device (in this case, the switching ASIC) may write to a DMA buffer, which transfers a data structure to a buffer of the target device. The target device may then use a DMA to write the values to appropriate memory locations, and then may explicitly launch an instance of the OpenCL kernel. The OpenCL kernel then operates on the data, and may reverse the operation by writing values out from memory to outward facing buffers, which are then written to buffers of the originating device, which finally receives the output.

While such overhead is reasonable for complex algorithms that are performed relatively infrequently, in a context such as a data center where an algorithm must be performed at very high frequencies, the overhead may become a bottleneck. Thus, an embodiment of the specification includes an interface between the switching ASIC and the accelerator, wherein the interface is defined with awareness of the operation of the OpenCL kernel. This allows the interface to optimize the data operations and to provide data directly rather than via various buffers and memory locations.

In one example, the interface includes dedicated I/O channels for providing inputs from the core switching ASIC to the accelerator kernel, and outputs from the accelerator kernel to the switching ASIC. Thus, when the switching ASIC needs to access an instance of the accelerator kernel, it may place a data structure on the I/O channels, which can be provided directly to the accelerator kernel. The accelerator kernel may launch immediately on system startup, and may continuously wait for inputs. Thus, the accelerator kernel receives the inputs, performs its accelerated operation, and places the output on dedicated output I/O channels. The switching ASIC then receives the outputs, and may continue to perform its function.

Advantageously, not only does this eliminate the various levels of DMA, buffers, and memory, but because the kernel instance runs continuously, there is very little overhead with accessing an instance of the kernel. Rather, as soon as the kernel receives the inputs, it performs its accelerated function, and writes the outputs to the dedicated I/O channels so that the switching ASIC receives its data very quickly.

In sum, this method ensures that the accelerator function does not become a bottleneck in the network architecture, but rather that the function runs smoothly and efficiently.

There is also disclosed, by way of example herein, a computing system comprising a system compiler that is capable of compiling the interconnected system as described above. For example, the system compiler may include a P4 compiler for compiling P4 code into the switching ASIC, and an OpenCL compiler for compiling OpenCL code into the accelerator function. Finally, the system compiler may include an interface compiler for compiling an interface including special-purpose I/O channels for enabling the switching ASIC to communicate quickly with the accelerator. This compiler may also have a hardware builder interface that enables the compiled programs to then be written out to a hardware builder apparatus that, for example, builds the appropriate ASICs, performs the gate configuration on an FPGA, or compiles code for execution on a target CPU or GPU. A system and method for tightly integrated accelerator functions will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
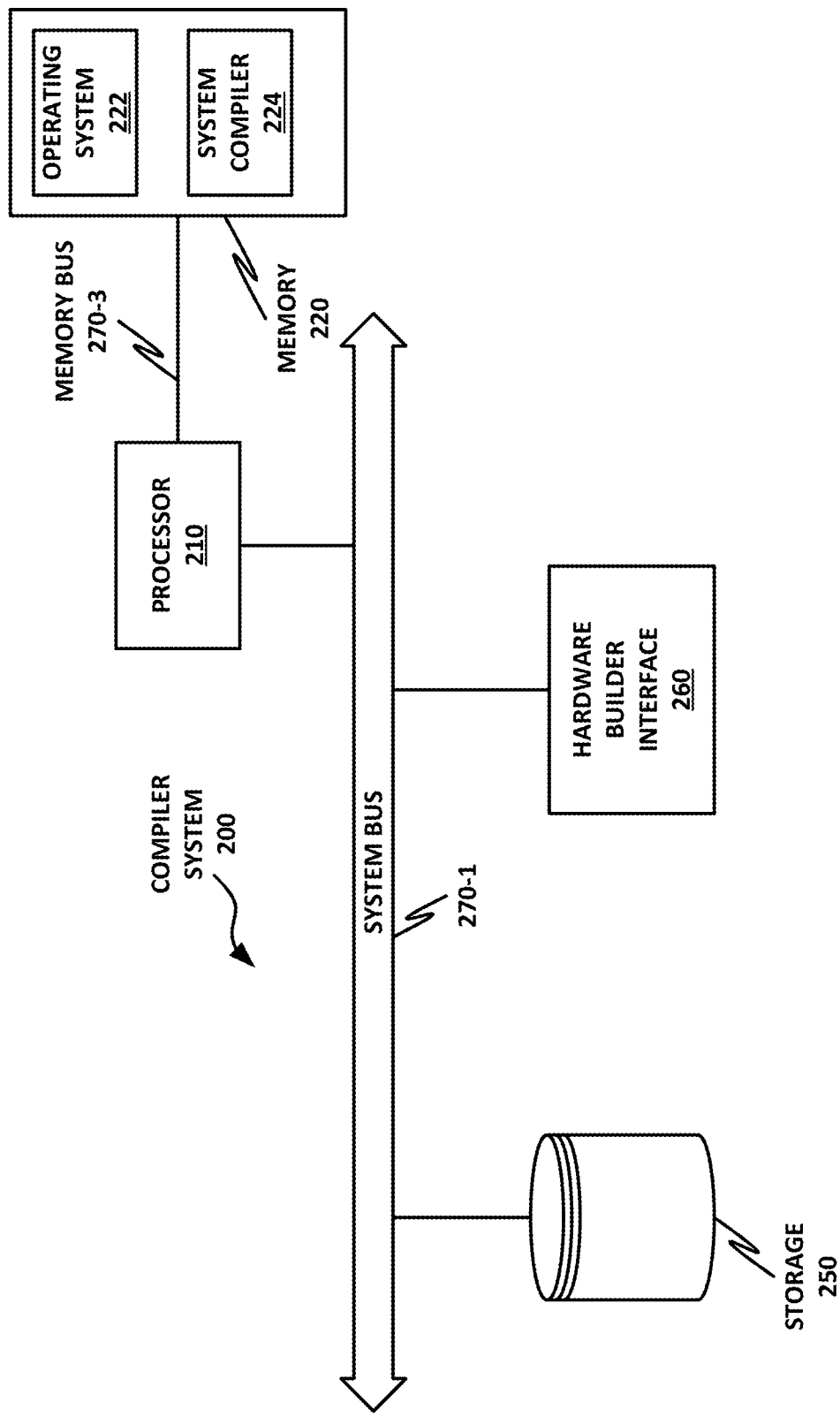
FIG. 2 is a block diagram of a client device according to one or more examples of the present specification.

FIG. 2 is a block diagram of compiler system 200 according to one or more examples of the present specification. Compiler system 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Compiler system 200 includes a processor 210 connected to a memory 220, having stored therein executable instructions for providing an operating system 222 and at least software portions of a system compiler 224. Other components of compiler system 200 include a storage 250 and hardware builder interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices, such as in the case of a data center storage pool or memory server. In the case of virtual machines or hypervisors, all or part of a function may be provided in the form of software or firmware running over a virtualization layer to provide the disclosed logical function. In other examples, a device such as a hardware builder interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block.

As used throughout this specification, "logic elements" may include hardware (including for example a programmable software, ASIC, or FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. In data center environments, memory bus 270-3 may be, or may include, the fabric.

Processor 210 may be communicatively coupled to other devices via a system bus 270-1. As used throughout this specification, a "bus" includes any wired or wireless interconnection line, network, connection, fabric, bundle, single bus, multiple buses, crossbar network, single-stage network, multistage network, or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor (DSP), field-programmable gate array (FPGA), graphics processing unit (GPU), programmable logic array (PLA), application-specific integrated circuit (ASIC), or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, persistent memory, cache, L1 or L2 memory, on-chip memory, registers, flash, ROM, optical media, virtual memory regions, magnetic or tape memory, or similar. Memory 220 may be provided locally, or may be provided elsewhere, such as in the case of a datacenter with a 3DXP memory server. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. These lines can be particularly blurred in cases where the only long-term memory is a battery-backed RAM, or where the main memory is provided as PFM It should also be noted that although DMA is disclosed by way of non-limiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linux or a dedicated embedded OS such as VxWorks. However, these examples are not intended to be limiting.

Storage 250 may be any species of memory 220, or may be a separate non-volatile memory device. Storage 250 may include one or more non-transitory computer-readable mediums, including by way of non-limiting example, a hard drive, solid-state drive, external storage, redundant array of independent disks (RAID), redundant array of independent nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of system compiler 224. In some examples, storage 250 may be a non-transitory computer-readable storage medium that includes hardware instructions or logic encoded as processor instructions or on an ASIC. Many other configurations are also possible, and are intended to be encompassed within the broad scope of this specification.

Hardware builder interface 260 may be provided to communicatively couple compiler system 200 to a wired or wireless network. A "network," as used throughout this specification, may include any communicative platform or medium operable to exchange data or information within or between computing devices, including by way of non-limiting example, Ethernet, WiFi, a fabric, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment. Note that in certain embodiments, hardware builder interface 260 may be, or may include, a host fabric interface (HFI).

System compiler 224, in one example, is operable to carry out computer-implemented methods as described in this specification. System compiler 224 may include one or more tangible non-transitory computer-readable mediums having stored thereon executable instructions operable to instruct a processor to provide an system compiler 224. System compiler 224 may also include a processor, with corresponding memory instructions that instruct the processor to carry out the desired method. As used throughout this specification, an "engine" includes any combination of one or more logic elements, of similar or dissimilar species, operable for and configured to perform one or more methods or functions of the engine. In some cases, system compiler 224 may include a special integrated circuit designed to carry out a method or a part thereof, and may also include software instructions operable to instruct a processor to perform the method. In some cases, system compiler 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that system compiler 224 may also include other hardware and software, including configuration files, registry entries, and interactive or user-mode software by way of non-limiting example.

In one example, system compiler 224 includes executable instructions stored on a non-transitory medium operable to perform a method according to this specification. At an appropriate time, such as upon booting compiler system 200 or upon a command from operating system 222 or an end user, processor 210 may retrieve a copy of the instructions from storage 250 and load it into memory 220. Processor 210 may then iteratively execute the instructions of system compiler 224 to provide the desired method.

A peripheral interface may be configured to interface with any auxiliary device that connects to compiler system 200 but that is not necessarily a part of the core architecture of compiler system 200. A peripheral may be operable to provide extended functionality to compiler system 200, and may or may not be wholly dependent on compiler system 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

Hardware builder interface 260 is an interface that enables compiler system 200 to interface with an internal or external system that performs the actual hardware build for implementing the program compiled by system compiler 224. Hardware builder interface 260 may take many different forms. For example, hardware builder interface 260 could be an interface to write the compiled program out to a configuration file, which can then be used to program a target CPU or GPU. Hardware builder interface 260 could include object or executable files that can then be ported to execute on a CPU or GPU. Hardware builder interface 260 could include a circuit design or netlist that can be used to build a special-purpose ASIC. Hardware builder interface 260 could include gate configuration for programming an FPGA.

In all of the foregoing examples, the apparatus for actually carrying out the instructions of the hardware builder interface may be integrated into compiler system 200, or may be provided by a separate external system. Taking an FPGA as a nonlimiting example, compiler system 200 may include an FPGA programmer with a socket for receiving an FPGA. In this case, system compiler 224 writes the gate configuration for the FPGA, sends the gate configuration out to the programmer, and an FPGA in the physical socket is then programmed with the appropriate gate configuration. However, an ASIC component of the system, such as an ASIC for providing the core switching logic may be manufactured separately in a fab. Thus, hardware builder interface 260 may simply export a netlist, a mask definition, or other information for manufacturing the ASIC that can then be used at an off-site fab.

System compiler 224 is a compiler that is configured to compile the core switching logic, such as may be provided on an ASIC or a CPU, an accelerator function that may be provided separately on an FPGA, and interface definitions for providing communication between the two.

Figure 3:
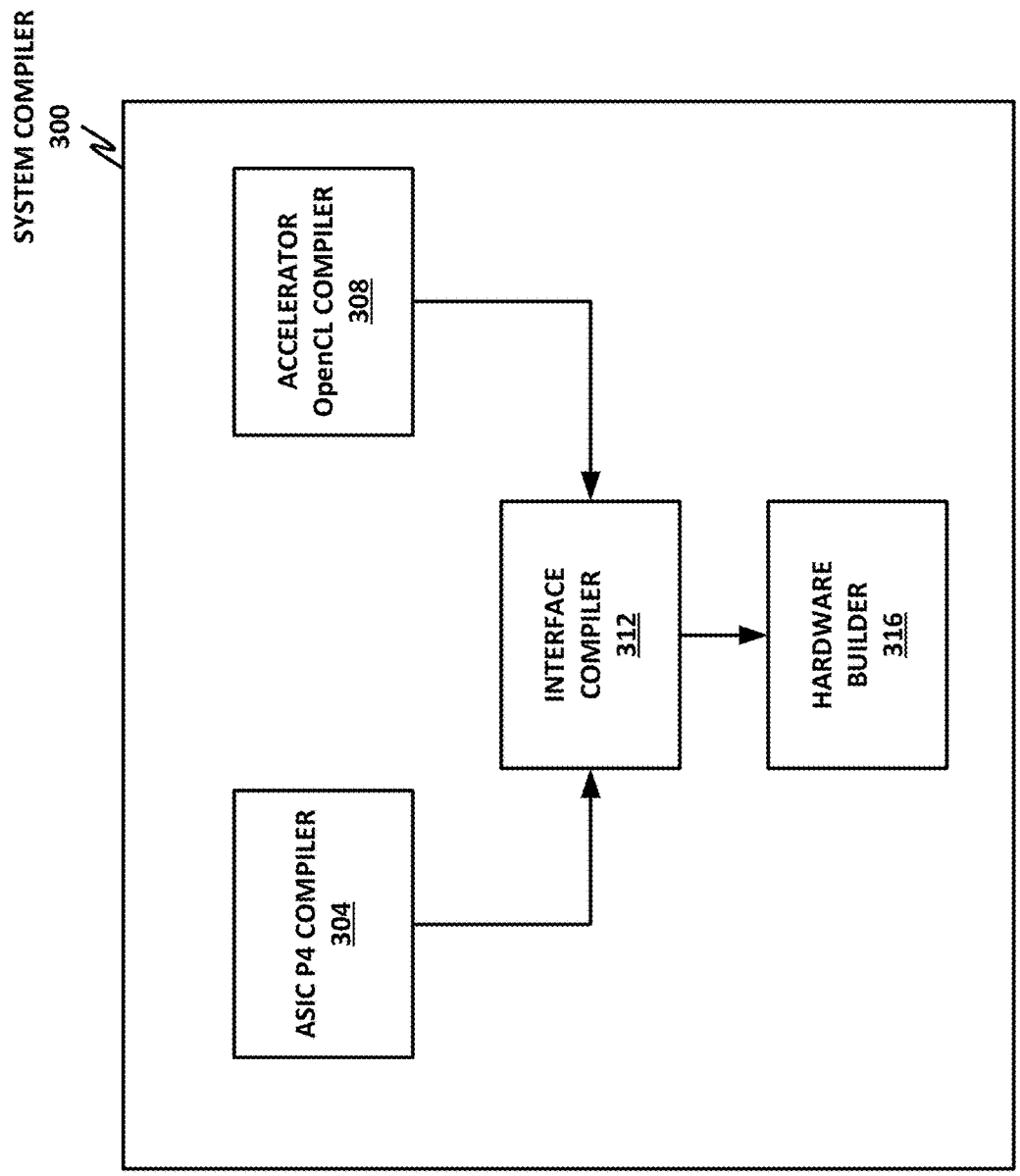
FIG. 3 is a block diagram illustrating with more particularity certain features of a system compiler according to one or more examples of the present specification.

FIG. 3 is a block diagram of a system compiler 300 illustrating with more particularity certain features of system compiler 300.

In the example of FIG. 3, the core switching logic is provided on a switching ASIC. The accelerator function is provided separately on an FPGA. However, this should be understood to be a nonlimiting example. In general terms, the core switching logic can be provided on any suitable hardware, and the accelerator can be provided on any other suitable hardware. Furthermore, in certain embodiments, the core switching logic and the accelerator could be provided on the same die in an integrated circuit. In that case, the accelerator may be thought of as a separate logical block from the switching ASIC. But physically, they are collocated, and may communicate via on-die buses.

In this example, system compiler 300 includes a P4 compiler 304. The P4 compiler is configured to receive P4 source code, and to compile the P4 source code into an appropriate ASIC circuit, CPU, FPGA, and network processor that can be used to provide the core switching logic.

Accelerator OpenCL compiler 308 is a compiler that receives OpenCL source code, and compiles it into appropriate code for an accelerator. Accelerators are commonly provided on dedicated hardware such as an ASIC or an FPGA, although they are also sometimes provided in software on general-purpose programmable processors, such as CPUs or GPUs. Thus, in some cases, OpenCL compiler 308 may provide a gate configuration for an FPGA, while in other cases, the output of OpenCL compiler 308 is software instructions that can be provided on a tangible, nontransitory computer readable medium that can be read by a processor.

Interface compiler 312 is provided to define and provide the interfaces between ASIC P4 compiler 304 and accelerator OpenCL compiler 308. This can be in the form, for example, of providing dedicated I/O channels between the switching ASIC and the accelerator, so that the accelerator can implicitly launch an instance of its kernel with very low overhead.

One challenge associated with an accelerator providing an accelerated function to the packet switching ASIC is that OpenCL is optimized for parallel programming, such as on GPU's. This provides the ability to efficiently coalesce processing results from "n" threads operating on shared data structures. However, in some embodiments, not all threads produce results, and it is thus desirable in some cases to return a smaller set of solutions as outputs. Thus, in some embodiments, interface compiler 312 may include a priority encoder to take those "n" inputs and choose the best solution. This is particularly useful when thread results are not mutually exclusive, but rather a best or optimum result is to be selected.

Figure 4:
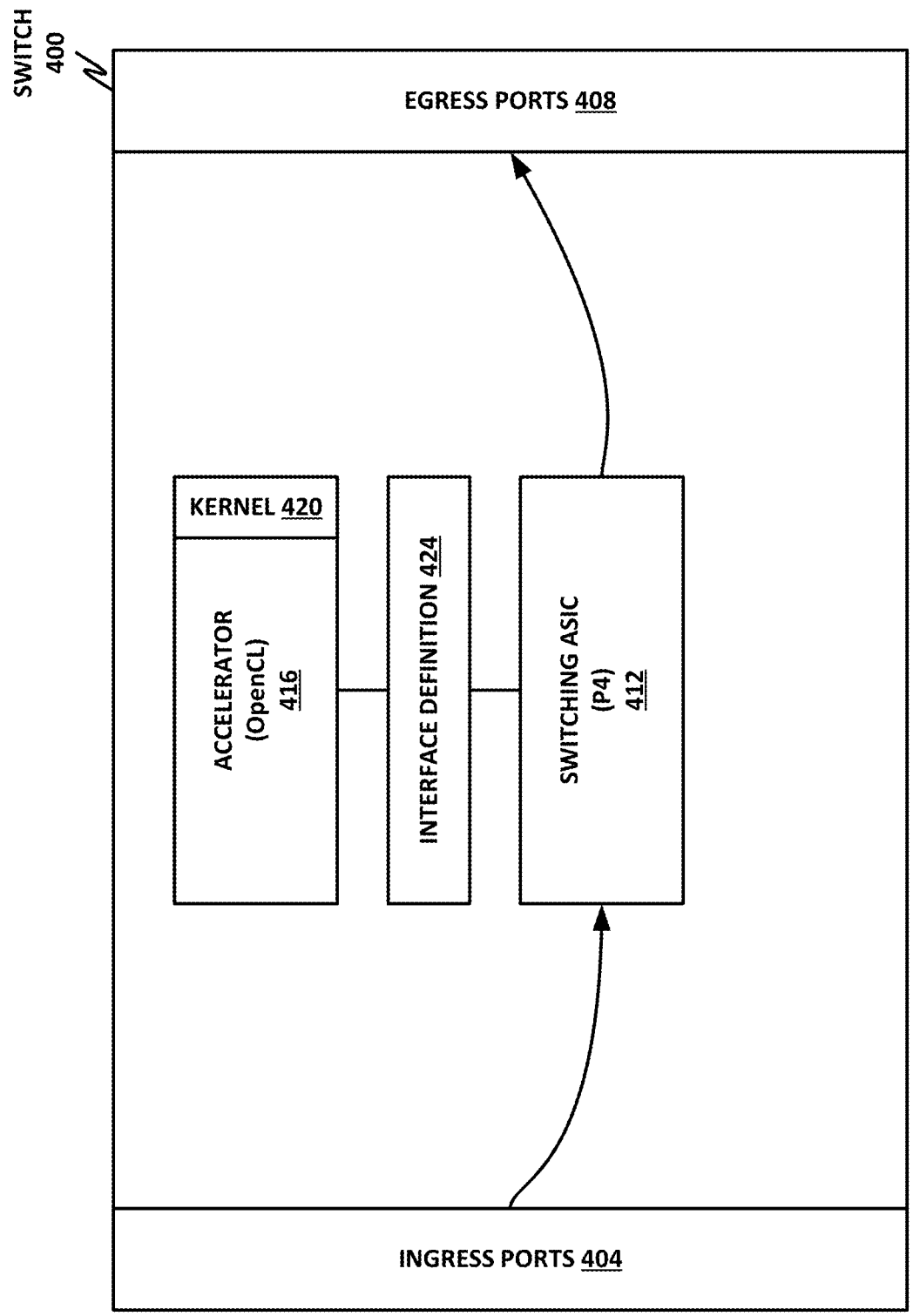
FIG. 4 is a block diagram of a network switch according to one or more examples of the present specification.

FIG. 4 is a block diagram of a network switch 400 according to one or more examples of the present specification. In the example of FIG. 4, switch 400 includes a plurality of ingress ports 404 that route traffic to a plurality of egress ports 408. In this example, switch 400 switches a plurality of ingress ports 404 to a plurality of egress ports 408 using switching ASIC 412. Switching ASIC 412 may be programmed in P4, or some other DSL. Note that because P4 is a portable DSL, switching ASIC 412 could be provided by any other suitable hardware, such as a CPU, GPU, FPGA, network processor, or similar.

In this case, switching ASIC 412 is aided by an accelerator 416. Accelerator 416 may be programmed in OpenCL, which advantageously is Turing complete and allows accelerator 416 to provide functions that are not supported by the P4 language. For example, accelerator 416 may provide accelerated encryption or decryption services on packets traversing the network. An OpenCL kernel 420 provides the logic of accelerator 416. Between switching ASIC 412 and accelerator 416 is an interface definition 424. When switching ASIC 412 encounters a packet that cannot be fully processed by its internal logic, interface definition 424 enables switching ASIC 412 to offload that packet to accelerator 416 for accelerated processing in kernel 420.

To provide just one illustrative example, packets coming into ingress ports 404 may be encrypted. However, workload servers connected to egress ports 408 may expect unencrypted packets. Thus, switch 400 may provide accelerated decryption on incoming packets. Similarly, packets from workload servers may need to be encrypted again before they are sent back out to the wide area network.

Thus, in this example, switching ASIC 412 may be unable to provide encryption and decryption services because it is programmed in P4, which does not presently support encryption and decryption operations. Thus, encryption and decryption services are offloaded to accelerator 416.

Once switching ASIC 412 receives an encrypted incoming packet, it operates interface definition 424 to provide the packet to accelerator 416. Accelerator 416 then operates kernel 420 to decrypt the packet. Accelerator 416 then operates interface definition 424 to provide the decrypted packet to switching ASIC 412. Finally, switching ASIC 412 switches the packet to the appropriate egress port 408.

As described above, in certain existing accelerators, routing a packet to accelerator 416 for decryption may include a process of writing data via DMAs to buffers, and from there to memory, explicitly launching an instance of the decryption kernel, decrypting the packet, routing the decrypted packets via various DMAs, buffers, and memories back to switching ASIC 412, and then terminating the instance of the encryption accelerator.

Figure 5:
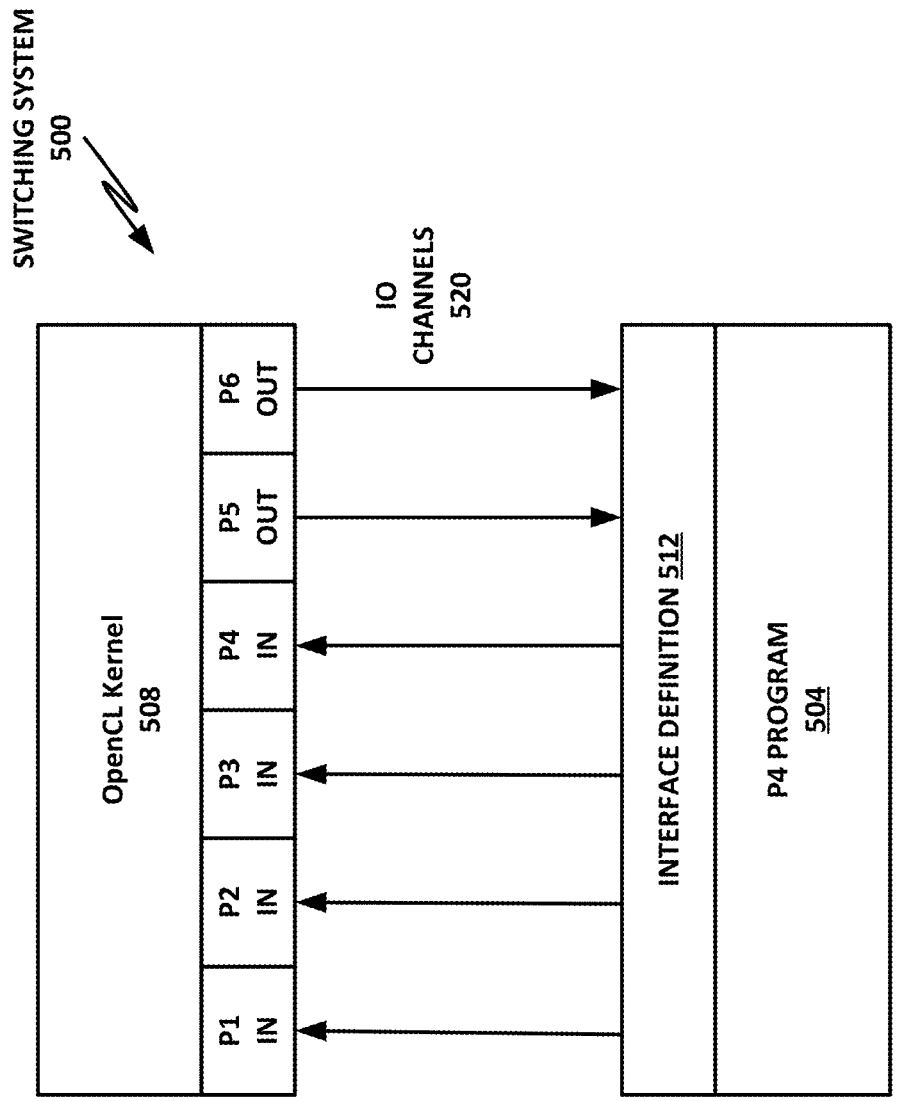
FIG. 5 is a block diagram of a switching system according to one or more examples of the present specification.

FIG. 5 is a block diagram of a switching system 500 according to one or more examples of the present specification. In the example of switching system 500, the process of launching kernel 508 is greatly streamlined by the use of an optimized interface definition, which includes dedicated I/O channels. In particular, switching system 500 may be one in which an "implicit kernel launch" is said to occur.

At system startup, P4 program 504, which may provide the core switching logic, starts up and is ready to receive incoming packets. Similarly, at system start time, OpenCL kernel 508 starts up and waits for incoming packets.

A series of dedicated I/O channels 520 are provided between P4 program 504 and kernel 508. Interface definition 512 dictates which types of data are placed on I/O channels 520.

In various embodiments, I/O channels 520 may be any suitable type of I/O channel, including, by way of nonlimiting example, a serial interface with protocol encapsulation, a PCIe interface, an Ethernet transaction interface, one or more on-die buses, or a coherent memory fabric.

Again using decryption as an example, P4 program 504 receives an incoming encrypted packet. P4 program 504 recognizes that the packet needs to be decrypted and that this will require the use of OpenCL kernel 508. Thus, P4 program 504 places the appropriate data on I/O channels 520. In this example, four channels named P1, P2, P3, and P4 are designated as input channels to OpenCL kernel 508. Thus, P4 program 504 may place the appropriate data or data structures on channels P1, P2, P3, and P4.

Once OpenCL kernel 508 receives the data on I/O channels P1, P2, P3, and P4, the already running instance of the decryption algorithm may immediately begin decrypting the packet. Once the packet is decrypted, output values may be placed on output channels P5 and P6.

P4 program 504 receives the decrypted packets via output channels P5 and P6, and then continues to perform its switching function on the now decrypted packet.

Advantageously, the use of dedicated I/O channels 520 reduces the overhead in performing an accelerated function on OpenCL kernel 508. Further advantageously, because OpenCL kernel 508 is already up and running, there is no need to launch a new instance and terminate it after the method is done. Rather, once OpenCL kernel 508 finishes operating on its presently available data, it simply continues to wait for new inputs.

Figure 6:
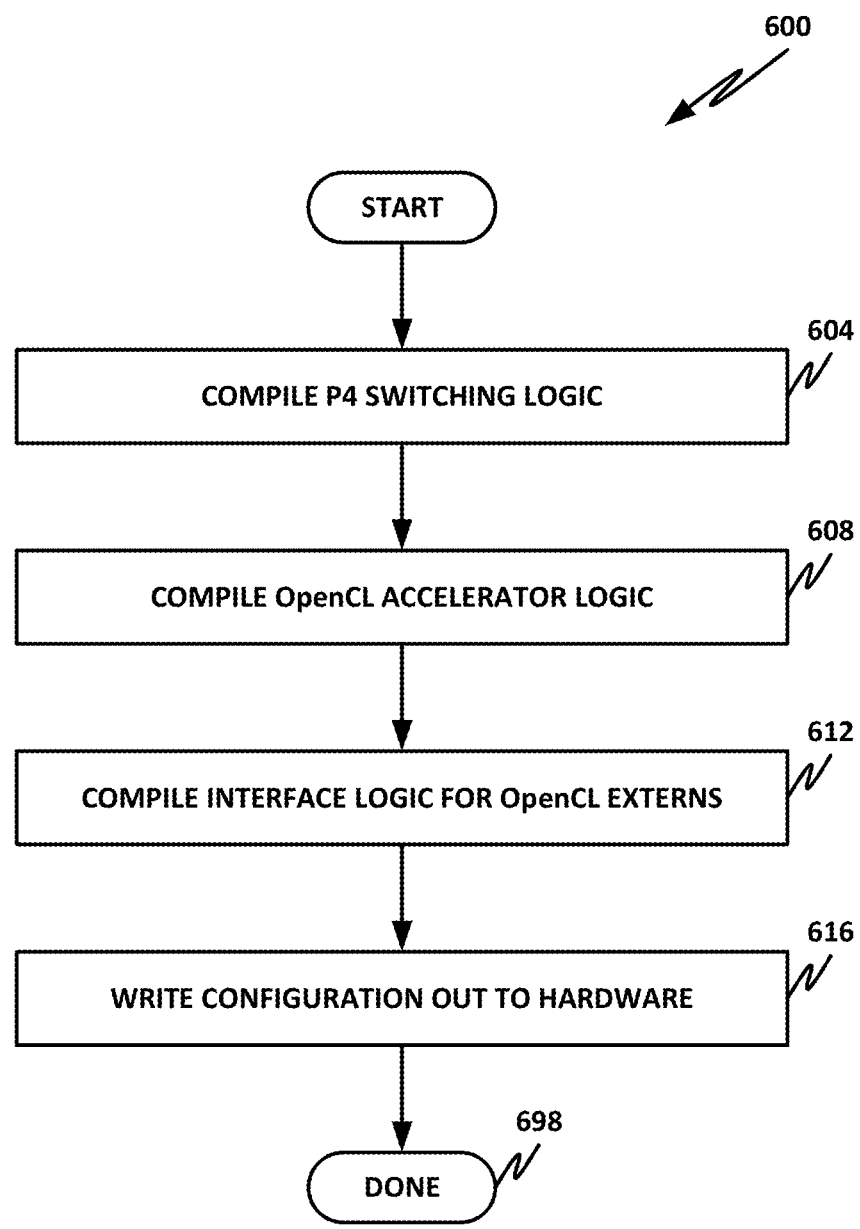
FIG. 6 is a method of compiling a switching system according to one or more examples of the present specification.

FIG. 6 is a method 600 of compiling a switching system according to one or more examples of the present specification.

In block 604, the core switching logic is compiled, such as from P4 source code. This may correspond, in one example, to ASIC P4 compiler 304 of FIG. 3. As noted above, P4 is a non-Turing complete language, and is thus particularly suited for compiling packet switching logic, and is highly optimized therefore. However, P4 may not be able to provide certain supplementary functions such as those described herein.

Thus, in block 608, an OpenCL compiler or other supplementary compiler compiles accelerator logic. OpenCL is used herein as a nonlimiting example of a specification that provides logic that can interoperate with the core switching logic described herein. This may correspond in certain embodiments to accelerator OpenCL compiler 308 of FIG. 3. This compiles a more general purpose accelerator function from a Turing complete language such as OpenCL. Note that a Turing complete language is provided herein as a nonlimiting example. In some examples, the accelerator language may not be Turing complete. Rather, the accelerator itself may be provided in a DSL that is highly optimized to the function of the accelerator.

In block 612, the compiler compiles interface logic for the accelerator functions. This provides an interface between the core switching logic and the accelerator function, which in some embodiments may include dedicated I/O channels as illustrated in I/O channels 520 of FIG. 5.

In block 616, the compiler writes a configuration out to one or more hardware interfaces. As discussed in more detail in FIG. 2, in connection with hardware builder interface 260, this may include operating a hardware builder apparatus that is directly connected to the compiler, or it may include exporting data to an externally operated hardware builder apparatus.

Figure 7:
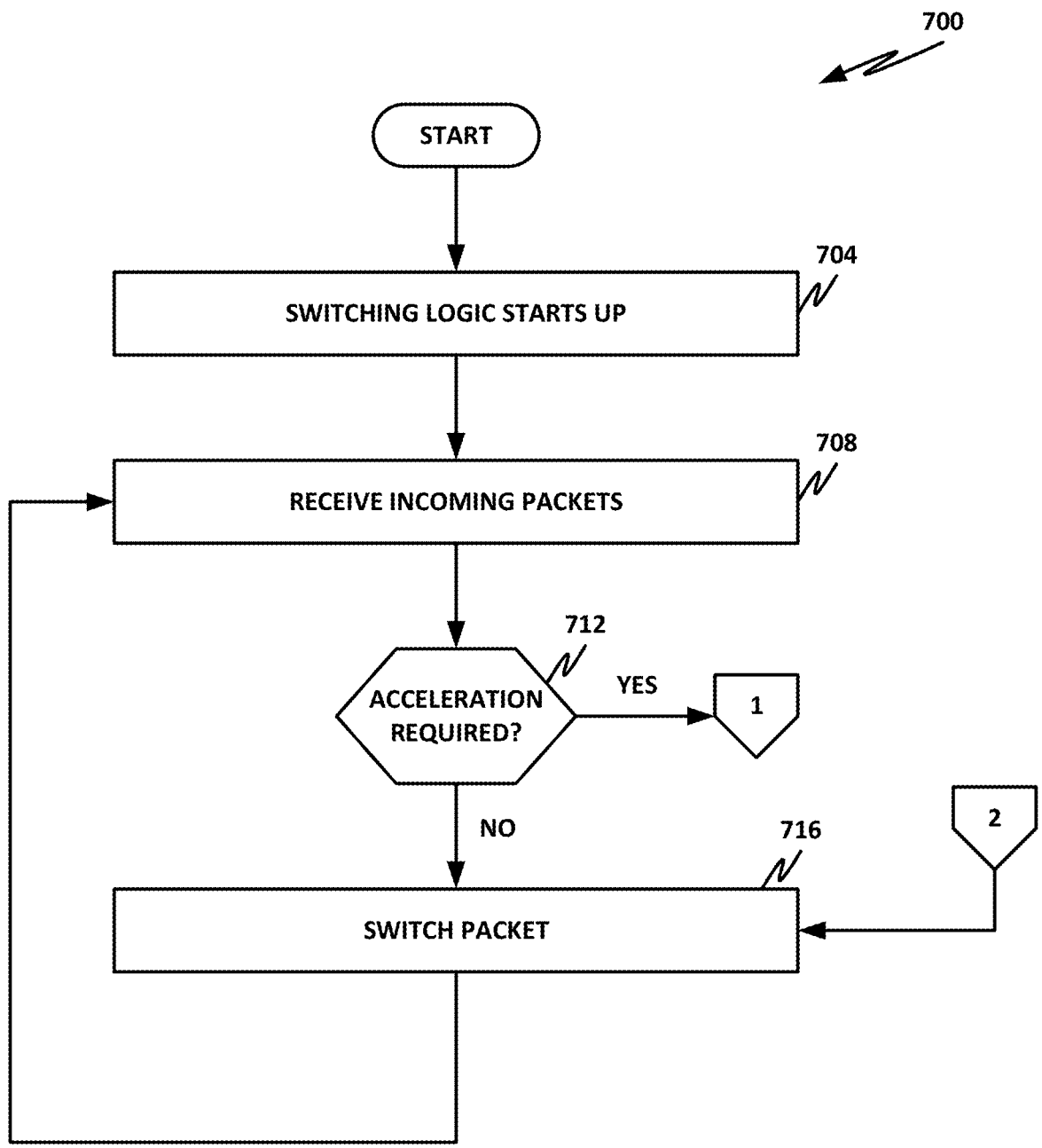
FIGS. 7-8 are flow diagrams illustrating interoperation between a core switching logic and an accelerator according to one or more examples of the present specification.
Figure 8:
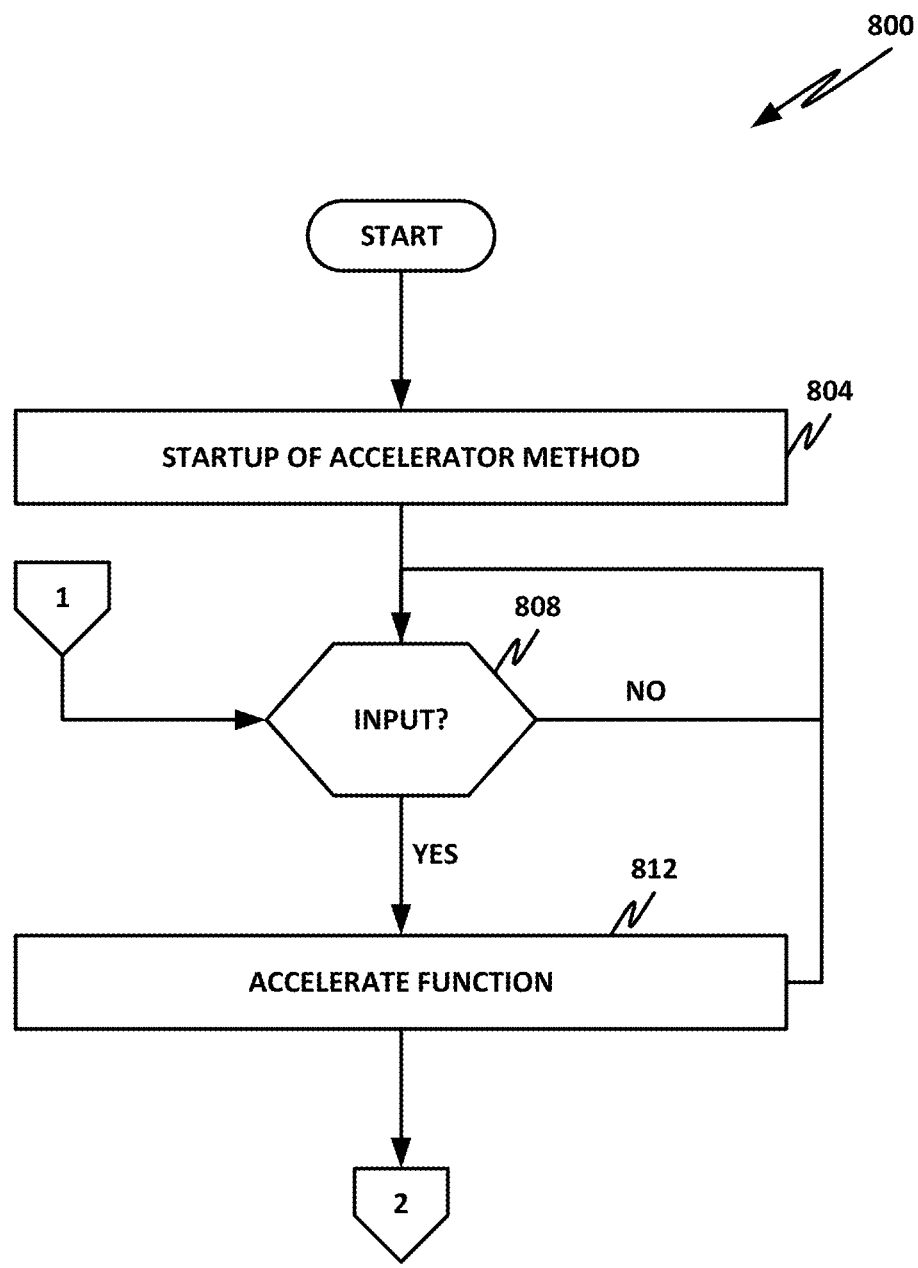

FIGS. 7-8 are flow diagrams 700 and 800 illustrating interoperation between a core switching logic and an accelerator according to one or more examples of the present specification. In this example, method 700 of FIG. 7 illustrates functions performed by the core switching logic. Method 800 a FIG. 8 illustrates methods performed by the accelerator.

Turning to FIG. 7, in block 704, the switching logic starts up, such as when power is applied to the system.

In block 708, the switching logic receives an incoming packet. Switching logic may inspect the incoming packet to determine whether it can be immediately switched to an egress port, or whether acceleration is required.

In decision block 712, the core switching logic determines whether acceleration is required on the present packet. If acceleration is required, then control flows to off page connector 1, which moves to FIG. 800 of FIG. 8.

If acceleration is not required, then in block 716, the core switching logic simply switches the packet to the appropriate egress interface.

Note that in block 716, a parallel path comes from off page connector 2. This represents a case where the packet was "punted" to the accelerator, the accelerator processed the packet, and then provided the packet back to the core switching logic. Thus, in block 716, the packet may be an unmodified packet that is switched to an egress interface, or may be a packet that has been modified in the accelerator, and is then switched to the egress interface.

Once the packet has been switched, control flows back to block 708, where the switch begins waiting for its next incoming packet.

Turning now to FIG. 8, logic is disclosed that may be performed on an accelerator, such as accelerator 416 of FIG. 4.

In this example, in block 804, the accelerator method is started up, such as application of system power. Note that in this case, an instance of the method may be started up, and may not be intended to be terminated while the system is running. Rather, an implicit kernel launch may be provided, wherein the kernel runs continuously and operates on data as soon as it receives it on its appropriate I/O channels.

In decision block 808, the accelerator checks to see whether it has received input, such as from the core switching logic. As illustrated here, input may come from off page connector 1, which routes from decision block 712 of FIG. 7, wherein it is determined that the current packet requires acceleration.

If no input is received, then the accelerator kernel may continue to wait in the loop until a packet is received. A loop is disclosed herein by way of nonlimiting example, and in other cases, other mechanisms may be employed, such as interrupts.

When an input is received, then in block 812, the existing accelerator kernel performs the accelerated function.

After performing the accelerated function, the result is sent to the core switching logic, such as via I/O channels 520 of FIG. 5, as illustrated in off page connector 2. Once the result has been sent to the core switching logic, control returns to decision block 808, where the accelerator kernel continues to wait for a new input.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein.

Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing system, comprising: a processor; a memory; a configuration interface to a logic configuration unit; and a system compiler comprising: a first block compiler to compile logic for a first logical block in a first language, the first language being a domain-specific language (DSL) and the first logical block being switching logic for a network switch; a second block compiler to compile logic for a second logical block in a second language, the second language being a non-DSL and providing an external accelerator method not supported by the first language; and an interface compiler to define input/output channels for encapsulated data interchange between the first logical block and the second logical block, wherein the encapsulated data interchange is to target a resident instance of the external accelerator method.

There is also disclosed an example of a computing system, wherein the compiler further comprises a logic builder to build the first logic block, second logic block, and input/output channels via the configuration interface.

There is also disclosed an example of a computing system, wherein the first language is P4.

There is also disclosed an example of a computing system, wherein the second language is an OpenCL-compliant Turing-complete language.

There is also disclosed an example of a computing system, wherein the input/output channels comprise protocol encapsulation.

There is also disclosed an example of a computing system, wherein the input/output channels comprise a PCIe interface.

There is also disclosed an example of a computing system, wherein the input/output channels comprise Ethernet transactions.

There is also disclosed an example of a computing system, wherein the input/output channels comprise an on-die bus.

There is also disclosed an example of a computing system, wherein the input/output channels comprise a coherent memory fabric.

There is also disclosed an example of one or more tangible, non-transitory computer-readable mediums having stored thereon instructions for providing a system compiler, the system compiler comprising: a first block compiler to compile logic for a first logical block in a first language, the first language being a domain-specific language (DSL) and the first logical block being switching logic for a network switch; a second block compiler to compile logic for a second logical block in a second language, the second language being a non-DSL and providing an external accelerator method not supported by the first language; and an interface compiler to define input/output channels for encapsulated data interchange between the first logical block and the second logical block, wherein the encapsulated data interchange is to target a resident instance of the external accelerator method.

There is also disclosed an example of one or more tangible, non-transitory computer-readable mediums, wherein the system compiler further comprises a logic builder to build the first logic block, second logic block, and input/output channels via a configuration interface.

There is also disclosed an example of one or more tangible, non-transitory computer-readable mediums, wherein the first language is P4.

There is also disclosed an example of one or more tangible, non-transitory computer-readable mediums, wherein the second language is an OpenCL-compliant Turing-complete language.

There is also disclosed an example of one or more tangible, non-transitory computer-readable mediums, wherein the input/output channels comprise a PCIe interface.

There is also disclosed an example of one or more tangible, non-transitory computer-readable mediums, wherein the input/output channels comprise Ethernet transactions.

There is also disclosed an example of one or more tangible, non-transitory computer-readable mediums, the input/output channels comprise an on-die bus.

There is also disclosed an example of a computer-implemented method of compiling a switching system, comprising: compiling logic for a first logical block in a first language, the first language being a domain-specific language (DSL) and the first logical block being switching logic for a network switch; compiling logic for a second logical block in a second language, the second language being a non-DSL and providing an external accelerator method not supported by the first language; defining input/output channels for encapsulated data interchange between the first logical block and the second logical block, wherein the encapsulated data interchange is to target a resident instance of the external accelerator method.

There is also disclosed an example of a computer-implemented method of compiling a switching system, wherein the system compiler further comprises a logic builder to build the first logic block, second logic block, and input/output channels via the configuration interface.

There is also disclosed an example of a computer-implemented method of compiling a switching system, wherein the first language is P4 and the second language is an OpenCL-compliant Turing-complete language.

There is also disclosed an example of a computer-implemented method of compiling a switching system, wherein the input/output channels comprise an interface selected from the group consisting of a PCIe interface, Ethernet transactions, an on-die bus, and a cache-coherent fabric.

What is claimed is:

1. A computing system, comprising:
    a processor;
    a memory;
    a configuration interface to a logic configuration unit; and
    a system compiler comprising:
        a first block compiler to compile logic for a compiled first logical block in a first language, the first language being a domain-specific language (DSL) and the compiled first logical block being switching logic for a network switch, wherein the compiled first logical block identifies data that cannot be processed using operations of the first language;
        a second block compiler to compile logic for a compiled second logical block in a second language, the second language being a non-DSL and providing an external accelerator method not supported by the first language; and
    an interface compiler to define input/output channels for encapsulated data interchange between the compiled first logical block and the compiled second logical block, wherein the encapsulated data interchange is to target a resident instance of the external accelerator method, wherein the input/output channels are dedicated for the encapsulated data interchange between the compiled first logical block and the compiled second logical block to process the identified data using the external accelerator method, and wherein the input/output channels comprise protocol encapsulation.

2. The computing system of claim 1, wherein the system compiler further comprises a logic builder to build the compiled first logical block, compiled second logical block, and the input/output channels via the configuration interface.

3. The computing system of claim 1, wherein the first language is P4.

4. The computing system of claim 1, wherein the second language is an OpenCL-compliant Turing-complete language.

5. The computing system of claim 1, wherein the input/output channels comprise a PCie interface.

6. The computing system claim 1, wherein the input/output channels comprise Ethernet transactions.

7. The computing system of claim 1, wherein the input/output channels comprise an on-die bus.

8. The computing system of claim 1, wherein the input/output channels comprise a coherent memory fabric.

9. The computing system of claim 1, wherein data is exchanged using the encapsulated data interchange between the compiled first logical block and the compiled second logical block at runtime.

10. One or more tangible, non-transitory computer-readable media having stored thereon instructions for providing a system compiler, the system compiler comprising:
   a first block compiler to compile logic for a compiled first logical block in a first language, the first language being a domain-specific language (DSL) and the compiled first logical block being switching logic for a network switch, wherein the compiled first logical block identifies data that cannot be processed using operations of the first language;
   a second block compiler to compile logic for a compiled second logical block in a second language, the second language being a non-DSL and providing an external accelerator method not supported by the first language; and
   an interface compiler to define input/output channels for encapsulated data interchange between the compiled first logical block and the compiled second logical block, wherein the encapsulated data interchange is to target a resident instance of the external accelerator method, wherein the input/output channels are dedicated for the encapsulated data interchange between the compiled first logical block and the compiled second logical block to process the identified data using the external accelerator method, and wherein the input/output channels comprise protocol encapsulation.

11. The one or more tangible, non-transitory computer-readable media of claim 10, wherein the system compiler further comprises a logic builder to build the compiled first logical block, the compiled second logical block, and the input/output channels via a configuration interface.

12. The one or more tangible, non-transitory computer-readable media of claim 10, wherein the first language is P4.

13. The one or more tangible, non-transitory computer-readable media of claim 10, wherein the second language is an OpenCL-compliant Turing-complete language.

14. The one or more tangible, non-transitory computer-readable media of claim 10, wherein the input/output channels comprise a PCie interface.

15. The one or more tangible, non-transitory computer-readable media of claim 10, wherein the input/output channels comprise Ethernet transactions.

16. The one or more tangible, non-transitory computer-readable media of claim 10, wherein the input/output channels comprise an on-die bus.

17. A computer-implemented method of compiling a switching system, comprising:
   compiling logic for a compiled first logical block in a first language, the first language being a domain-specific language (DSL) and the compiled first logical block being switching logic for a network switch, wherein the compiled first logical block identifies data that cannot be processed using operations of the first language;
   compiling logic for a compiled second logical block in a second language, the second language being a non-DSL and providing an external accelerator method not supported by the first language;
   defining input/output channels for encapsulated data interchange between the compiled first logical block and the compiled second logical block, wherein the encapsulated data interchange is to target a resident instance of the external accelerator method, wherein the input/output channels are dedicated for the encapsulated data interchange between the compiled first logical block and the compiled second logical block to process the identified data using the external accelerator method, and wherein the input/output channels comprise protocol encapsulation.

18. The computer-implemented method of claim 17, wherein the compiled first logical block, the compiled second logical block, and the input/output channels are built via a configuration interface of a logic builder of a system compiler.

19. The computer-implemented method of claim 17, wherein the first language is P4 and the second language is an OpenCL-compliant Turing-complete language.

20. The computer-implemented method of claim 17, wherein the input/output channels comprise an interface selected from the group consisting of a PCie interface, Ethernet transactions, an on-die bus, and a cache-coherent fabric.

* * * * *